United States Patent
Gong et al.

(10) Patent No.: US 12,461,171 B2
(45) Date of Patent: Nov. 4, 2025

(54) SINGLE PHASE BROKEN CONDUCTOR DETECTION

(71) Applicant: Schweitzer Engineering Laboratories, Inc., Pullman, WA (US)

(72) Inventors: Yanfeng Gong, Dublin, OH (US); Normann Fischer, Colfax, WA (US); Gandhali P Juvekar, Mountlake Terrace, WA (US); Kanchanrao Gangadhar Dase, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 252 days.

(21) Appl. No.: 18/503,273

(22) Filed: Nov. 7, 2023

(65) Prior Publication Data
US 2025/0147123 A1  May 8, 2025

(51) Int. Cl.
*H02H 7/00* (2006.01)
*G01R 31/54* (2020.01)
(Continued)

(52) U.S. Cl.
CPC .......... *G01R 31/54* (2020.01); *H02H 1/0007* (2013.01); *H02H 6/00* (2013.01)

(58) Field of Classification Search
CPC ...................................................... G01R 31/54
See application file for complete search history.

(56) References Cited

U.S. PATENT DOCUMENTS

| 4,297,740 A | 10/1981 | Hagberg |
| 4,347,542 A | 8/1982 | Calhoun |

(Continued)

FOREIGN PATENT DOCUMENTS

| CN | 1601848 | 3/2005 |
| CN | 101699301 | 4/2010 |

(Continued)

OTHER PUBLICATIONS

William O'Brien, et al. "Catching Falling Conductors in Midair— Detecting and Tripping Broken Distribution Circuit Conductors at Protection Speeds" Presented at the 42nd Annual Western Protective Relay Conference, Oct. 2015.

(Continued)

*Primary Examiner* — Stephen W Jackson
(74) *Attorney, Agent, or Firm* — Jared L. Cherry

(57) ABSTRACT

The present disclosure relates to systems and methods to detect a fault in an electric power system. One embodiment may detect a single phase broken conductor in a multi-phase electric power system. An intelligent electronic device (IED) may receive a plurality of measurements over time of a current through an electrical conductor in the electric power system. Based on the measurements of the current, a fault detection subsystem may determine a zero-sequence current, a negative-sequence current, and a positive-sequence current. The fault detection subsystem may determine a ratio of the zero-sequence current, the negative-sequence current, and the positive-sequence current, and may monitor the ratio over time. The fault detection subsystem may identify the broken conductor condition based on the ratio and a fault detection region. A protective action subsystem may implement a protective action based on identification of the broken conductor condition.

24 Claims, 12 Drawing Sheets

(51) Int. Cl.
*H02H 1/00* (2006.01)
*H02H 6/00* (2006.01)

(56) References Cited

U.S. PATENT DOCUMENTS

| | | | |
|---|---|---|---|
| 4,357,644 | A | 11/1982 | Schmidt |
| 4,600,961 | A | 7/1986 | Bishop |
| 5,883,578 | A | 3/1999 | Roberts |
| 6,453,248 | B1 | 9/2002 | Hart |
| 6,573,726 | B1 | 6/2003 | Roberts |
| 6,833,711 | B1 | 12/2004 | Hou |
| 7,720,619 | B2 | 5/2010 | Hou |
| 7,945,400 | B2 | 5/2011 | Hou |
| 8,289,668 | B2 | 10/2012 | Kasztenny |
| 8,321,162 | B2 | 11/2012 | Labuschagne |
| 8,581,723 | B2 | 11/2013 | Schweitzer |
| 8,942,954 | B2 | 1/2015 | Gong |
| 9,160,158 | B2 | 10/2015 | Schweitzer |
| 9,413,156 | B2 | 8/2016 | O'Brien |
| 9,509,399 | B2 | 11/2016 | Kasztenny |
| 9,568,516 | B2 | 2/2017 | Gubba Ravikumar |
| 10,340,684 | B2 | 7/2019 | Sridharan |
| 10,823,777 | B2 | 11/2020 | Dase |
| 10,910,826 | B2* | 2/2021 | Sridharan ............ G01R 31/085 |
| 11,143,715 | B2 | 10/2021 | Bell |
| 11,946,966 | B1* | 4/2024 | Chowdhury .......... G01R 31/346 |
| 12,362,556 | B2* | 7/2025 | Juvekar .................. H02H 7/226 |
| 2005/0057212 | A1 | 3/2005 | Harbaugh |
| 2005/0231871 | A1 | 10/2005 | Karimi |
| 2007/0055889 | A1 | 3/2007 | Henneberry |
| 2008/0031520 | A1 | 2/2008 | Hou |
| 2008/0211511 | A1 | 9/2008 | Choi |
| 2011/0075304 | A1 | 3/2011 | Hamer |
| 2012/0063040 | A1 | 3/2012 | Rostron |
| 2012/0068717 | A1 | 3/2012 | Gong |
| 2012/0161684 | A1 | 6/2012 | Tiwari |
| 2012/0330582 | A1 | 12/2012 | Wiszniewski |
| 2013/0107405 | A1 | 5/2013 | Blumschein |
| 2013/0221976 | A1 | 8/2013 | Blumschein |
| 2014/0028116 | A1 | 1/2014 | O'Brien |
| 2015/0124358 | A1 | 5/2015 | Hulse |
| 2016/0041216 | A1 | 2/2016 | Tang |
| 2016/0091537 | A1 | 3/2016 | Gaarder |
| 2016/0266193 | A1 | 9/2016 | Ennis |
| 2016/0299187 | A1 | 10/2016 | Liang |
| 2016/0308349 | A1 | 10/2016 | Sridharan |
| 2017/0315168 | A1 | 11/2017 | Benmouyal |
| 2018/0106851 | A1* | 4/2018 | Schweitzer, III ...... H02H 7/261 |
| 2018/0284180 | A1 | 10/2018 | Ha |
| 2019/0317143 | A1 | 10/2019 | Dase |
| 2021/0048486 | A1* | 2/2021 | Bell ..................... G01R 31/085 |

FOREIGN PATENT DOCUMENTS

| | | |
|---|---|---|
| CN | 102608491 | 7/2012 |
| CN | 102694375 | 9/2012 |
| CN | 102696161 | 9/2012 |
| CN | 103308823 | 9/2013 |
| CN | 104730410 | 6/2015 |
| CN | 204462305 | 7/2015 |
| CN | 105738751 | 7/2016 |
| CN | 106908692 | 6/2017 |
| CN | 105207176 | 7/2017 |
| CN | 109324269 | 2/2019 |
| CN | 109975661 | 7/2019 |
| WO | 2007086944 | 8/2007 |
| WO | 2014018909 | 1/2014 |
| WO | 2019229638 | 12/2019 |

OTHER PUBLICATIONS

Kanchanrao Dase and Normann Fischer, "Computationally Efficient Methods for Improved Double-Ended Transmission Line Fault Locating" Originally Presented at the 45th Annual Western Protective Relay Conference, Oct. 2018.

* cited by examiner

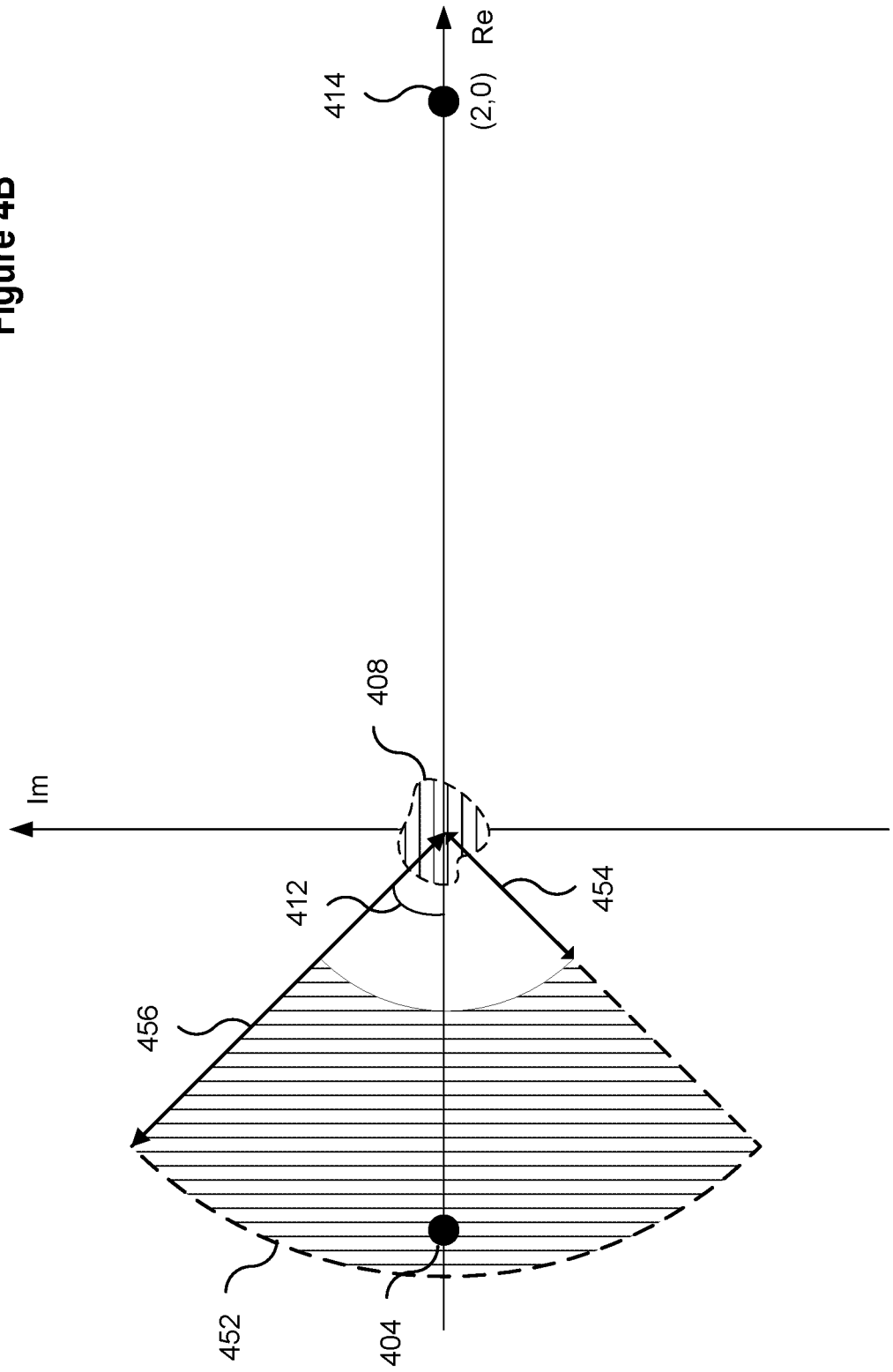

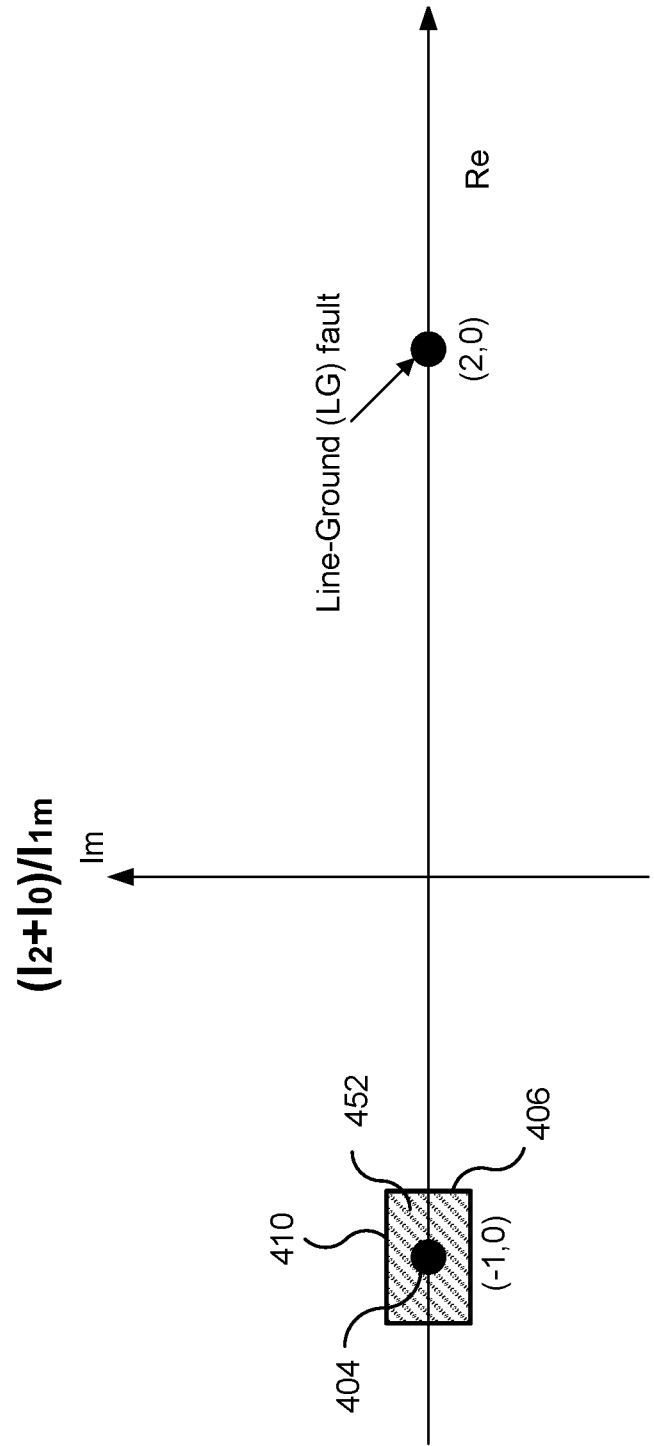

SINGLE PHASE BROKEN CONDUCTOR DETECTION

TECHNICAL FIELD

The present disclosure relates to systems and methods to identify breaks in energized conductors in an electric power system. More particularly, the present disclosure relates to identifying a broken conductor associated with one phase in a multi-phase power system based on a relationship of a zero-sequence current ($I_0$), a negative-sequence current ($I_2$), and a positive-sequence current ($I_1$).

BRIEF DESCRIPTION OF THE DRAWINGS

Non-limiting and non-exhaustive embodiments of the disclosure are described, including various embodiments of the disclosure with reference to the figures, in which:

FIG. 4B illustrates a sequence current diagram showing a broken conductor fault detection region consistent with embodiments of the present disclosure.

FIG. 4C illustrates a sequence current diagram with a reduced operating region for a two-terminal line that experiences a complete loss of load for a broken phase consistent with embodiments of the present disclosure.

Figure 1:
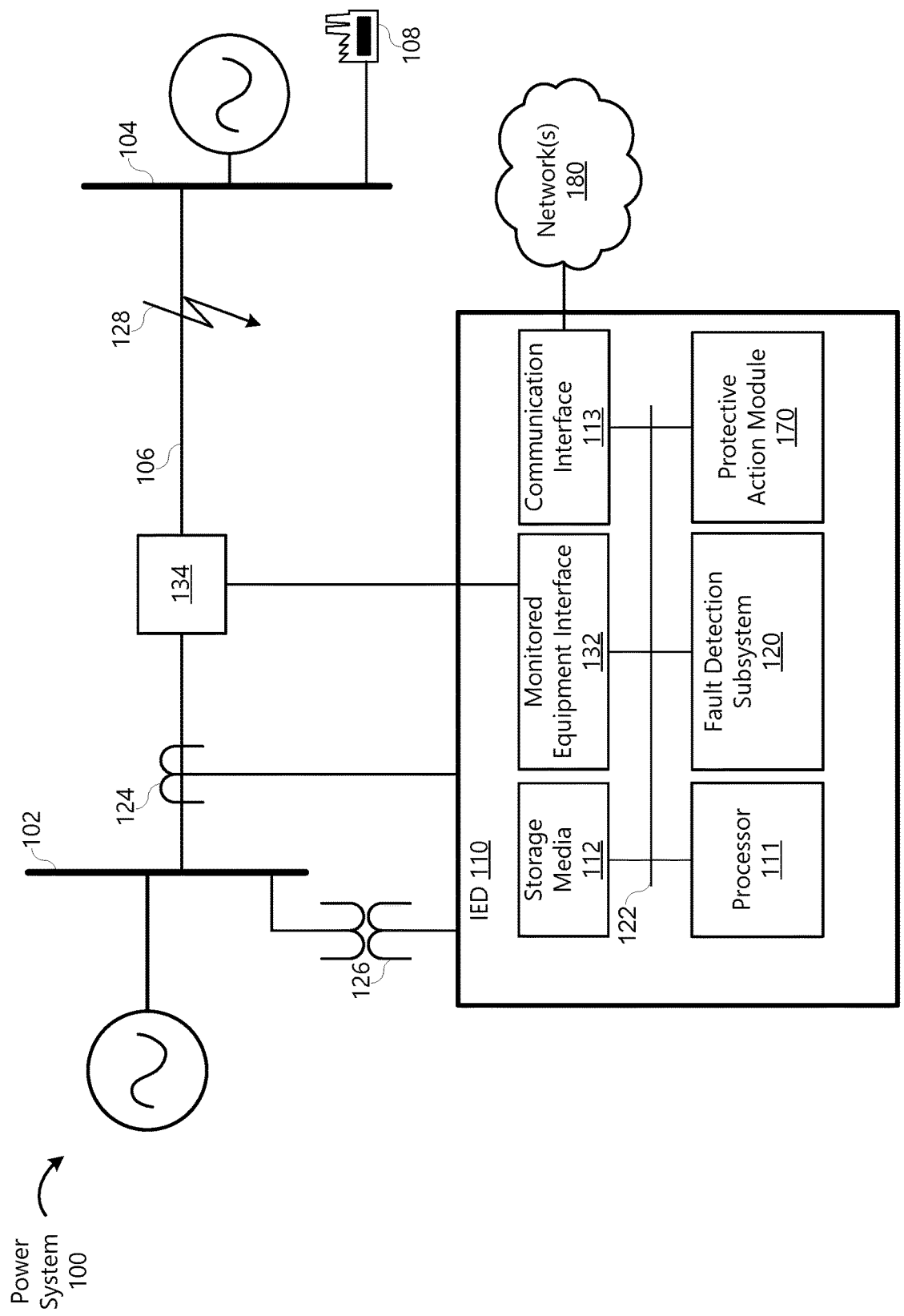
FIG. 1 illustrates a simplified one-line diagram of an electric power system consistent with embodiments of the present disclosure.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The present disclosure relates to systems and methods to identify breaks in energized conductors in an electric power system. In addition to interrupting electrical service, broken electrical conductors may create hazardous conditions. For example, an energized electrical conductor may create electrical arcs that can cause fires and/or injury to persons in the vicinity. Detecting broken conductors and implementing remedial action can minimize such conditions.

Various embodiments disclosed herein may enable rapid detection of broken conductors. Such rapid detection may enable the de-energization of a broken conductor before a suspended conductor can fall to the ground. When an energized conductor contacts the ground, arcing is likely, and as such, deenergizing the broken conductor before it falls to the ground may improve safety.

Some specific embodiments may implement broken conductor detection schemes using local measurements only. Relying exclusively on local measurements eliminates a need for communication between devices at terminals of a monitored conductor. The ability to implement the techniques disclosed herein using only local measurements may decrease costs of implementation (e.g., by avoiding a need to provide a communication channel between the terminals of a monitored conductor) and may facilitate implementation in both electrical transmission systems and electrical distribution systems.

Various embodiments consistent with the present disclosure may monitor a relationship of combined zero-sequence, negative-sequence current, and positive-sequence current information to detect a break in a conductor. More specifically, but not exclusively, systems consistent with the present disclosure may monitor a ratio of the sum of a zero-sequence ($I_0$) and a negative-sequence ($I_2$) current, divided by a positive-sequence ($I_1$) current, as shown in Equation (1).

$$\frac{I_0 + I_2}{I_1} \qquad \text{Eq. 1}$$

Under idealized conditions, Eq. 1 equals −1 in response to an open circuit of a single-phase conductor. An open circuit condition is indicative of a broken conductor that is not in contact with the ground. In response to detection of a condition in which Eq. 1 equals −1, a protective system may implement a protective action to deenergize the broken conductor. Under real-world conditions and in various embodiments consistent with the present disclosure, a range of conditions including and surrounding a region in which Eq. 1 equals −1 may be indicative of a broken conductor and may trigger a protective action to deenergize the broken conductor.

The present disclosure pertains primarily to detection of broken conductors; however, other conditions may also be detected based on Eq. 1. The idealized values for certain conditions are listed in Table 1.

TABLE 1

| Fault Type | $I_0, I_2, I_1$ relationship |
|---|---|
| Single-phase-ground fault | $\frac{I_0 + I_2}{I_1} = 2$ |
| Phase-phase fault | $\frac{I_0 + I_2}{I_1} = -1, I_0 \approx 0$ |
| Phase-phase-ground fault | $\frac{I_0 + I_2}{I_1} = -1$ |
| Single-phase-open fault | $\frac{I_0 + I_2}{I_1} = -1$ |
| 3-phase fault | $\frac{I_0 + I_2}{I_1} = 0$ |

To differentiate the single-phase-broken-conductor (SPBC) condition from other shunt fault types listed in Table 1, systems consistent with the present disclosure may monitor both a positive-sequence current ($I_1$) and a phase current. These values differentiate SPBC condition from other faults because: (A) positive-sequence current does not increase during SPBC condition, and (B) the broken-conductor phase has the smallest phase current among all three phases for transmission applications. In addition, the broken-conductor phase will exhibit a purely capacitive load when the break occurs at a location that results in the disconnection of all load.

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and/or a product of a process.

The phrases "connected to," "networked," and "in communication with" refer to any form of interaction between two or more entities, including mechanical, electrical, magnetic, and electromagnetic interaction. Two components may be connected to each other, even though they are not in direct physical contact with each other and even though there may be intermediary devices between the two components.

Some of the infrastructure that can be used with embodiments disclosed herein are already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as: non-volatile memory, static RAM, dynamic RAM, ROM, CD-ROM, disk, tape, magnetic, optical, flash memory, or other computer readable storage medium.

The described features, operations, or characteristics may be combined in any suitable manner in one or more embodiments. It will also be readily understood that the order of the steps or actions of the methods described in connection with the embodiments disclosed herein may be changed, as would be apparent to those skilled in the art. Thus, any order in the drawings or detailed description is for illustrative purposes only and is not meant to imply a required order, unless specified to require an order.

In the following description, numerous details are provided to give a thorough understanding of various embodiments. One skilled in the relevant art will recognize, however, that the embodiments disclosed herein can be practiced without one or more of the specific details, or with other methods, components, materials, etc. In other instances, well-known structures, materials, or operations are not shown or described in detail to avoid obscuring aspects of this disclosure.

FIG. 1 illustrates a simplified one-line diagram of an electric power system 100 consistent with embodiments of the present disclosure. Electric power system 100 may include multiple phases and additional equipment and complexity. Also illustrated is an IED 110 that may obtain electric power system 100 information either directly or from merging units (MUs), and effect control actions on the electric power system 100 to provide protection and automation to the electric power system 100. The electric power system 100 includes various equipment such as buses 102 and 104 electrically connected by one or more transmission lines 106. Various feeders may receive electric power from the second bus 104 via appropriate transformers and breakers for delivering electric power to distributed loads 108. Circuit breakers, such as circuit breaker 134 may be used to selectively connect and disconnect portions of the electric power system 100 for various purposes such as reconfiguration, implementation of a protection in the event of a fault, or the like. One or both of the buses 102, 104 may receive electric power from supplies such as generators, generation stations, transmission lines, and the like.

IED 110 may be in communication with the electric power system 100 and configured to detect a fault 128. IED 110 may detect various types of faults, including faults caused by a broken conductor. Still further, IED 110 may determine which phase in a multi-phase system is carried by the broken conductor, and implement a protective action. A bus 122 may permit communication among various elements of IED 110, including processor 111, storage media 112, communication interface 113, fault detection subsystem 120, monitored equipment interface 132, and protective action module 170.

IED 110 may obtain measurements from the electric power system 100 using a sensor component. The sensor component may receive input from a current transformer (CT) 124, a potential transformer (PT) 126 to obtain voltage measurements, or other instruments or similar devices to obtain measurements from the electric power system 100. Signals obtained may be filtered and sampled to produce digitized signals. Such digitized signals may be provided to processor 111. The IED 110 may be in communication with circuit breaker 134 (either directly or via a merging unit) via a monitored equipment interface 132 to obtain a status therefrom (open/closed) and to send commands (trip/close) to the circuit breaker 134.

The IED 110 may include one or more computer-readable storage media 112 embodied in one or more units, which may be packaged together with or separately from the processor 111. Storage media 112 may be a repository of computer-readable instructions that, when executed by the processor 111 cause the IED 110 to perform certain tasks. Storage media 112 may comprise volatile and non-volatile memory.

Fault detection subsystem 120 may be configured to calculate various sequence current quantities, including a zero-sequence current ($I_0$), a negative-sequence current ($I_2$), and a positive-sequence current ($I_1$). Moreover, fault detection subsystem 120 may analyze various relationships between such values, including the relationships set forth in Table 1. The fault detection subsystem 120 may monitor for conditions that reflect a fault.

IED 110 may include protective action module 170 (which may be embodied as computer instructions on storage media 112) to determine whether to trip the circuit breaker 134, and to send an open/trip signal to the circuit breaker 134 via the monitored equipment interface 132. In some embodiments, protective action module 170 may be configured to operate within a window defined by a time for a suspended conductor to fall to the ground. Implementing a protective action (e.g., de-energizing the conductor) may reduce or eliminate damage caused by arcing when an energized conductor contacts the ground. Such arcing may spark fires, cause other damage, and present a safety hazard.

IED 110 may operate using only local measurements (e.g., measurements from CT 124 and PT 126). Relying exclusively on local measurements eliminates the need for communication between devices at a remote end of transmission line 106. The ability of IED 110 to operate using only local measurements may decrease the costs of implementation (e.g., by avoiding the need to provide a communication channel between the terminals of a monitored conductor) and may facilitate implementation in both electrical transmission systems and electrical distribution systems. The ability to operate using only local measurements may facilitate the addition of systems and methods consistent with the present disclosure to existing electric power systems (i.e., retrofit applications), in addition to the implementation of such systems and methods in new electric power systems.

IED 110 may further include communication interface 113 in communication with one or more devices or systems via network 180. The communication interface 113 may be used to transmit signals that include measurements, states, and commands that are made or determined by IED 110 to other systems and devices.

Figure 2:
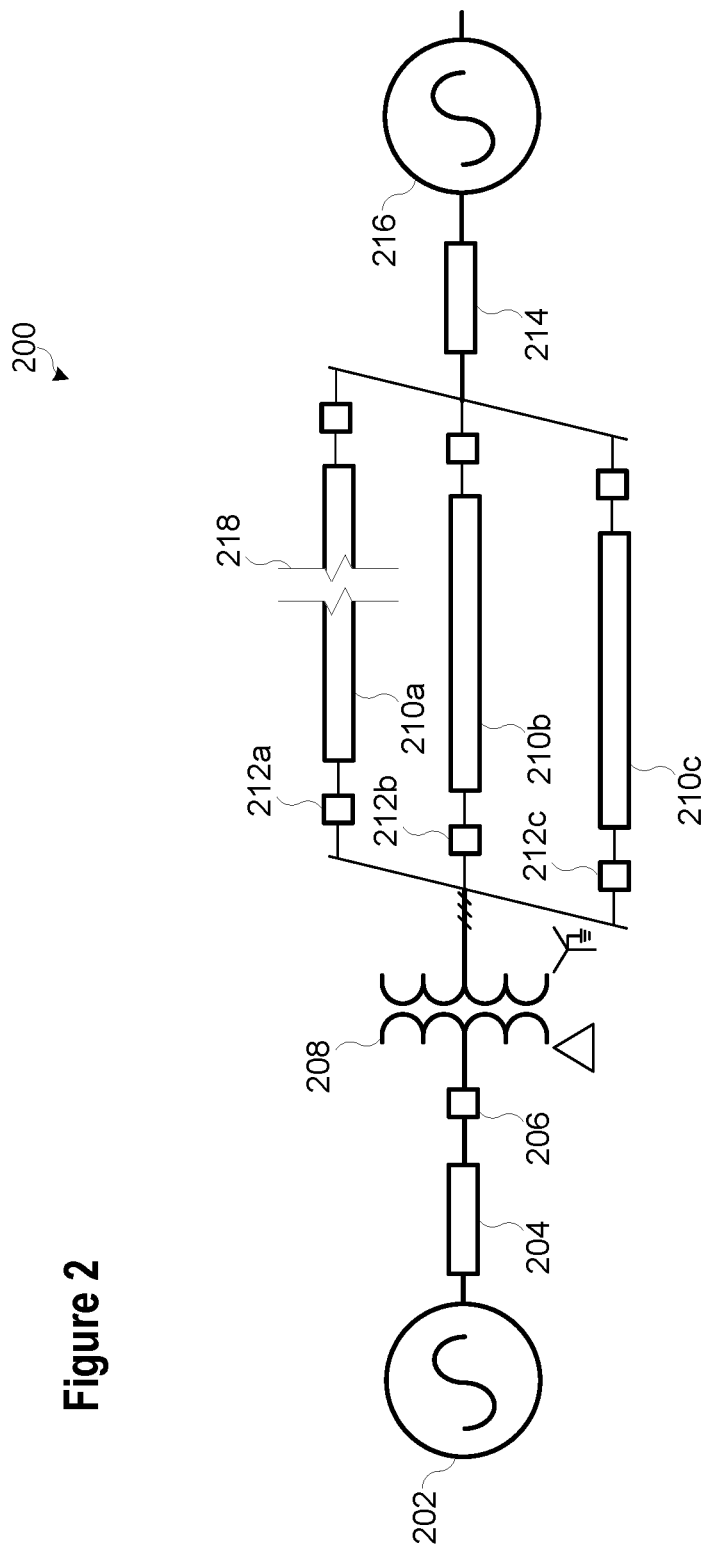
FIG. 2 illustrates a simplified diagram of a power system with three phases associated with three phase conductors consistent with embodiments of the present disclosure.

FIG. 2 illustrates a simplified diagram of a power system 200 with three phases, A, B, C carried on three phase conductors 210a, 210b, 210b consistent with embodiments of the present disclosure. The system is fed by sources 202 and 216. As illustrated, phase A is open at 218, which may be due to a broken conductor, with phases B and C closed (not faulted). A circuit breaker 206 may selectively disconnect source 202. Each phase may also include a separate breaker 212a, 212b, and 212c, to selectively open a single phase. A transformer 208 may be used to transform the current levels between source 202 and conductors 210a, 210b, 210c. Also shown are various system impedances, including a transmitting-end source impedance 204 and a receiving-end source impedance 214.

Figure 3:
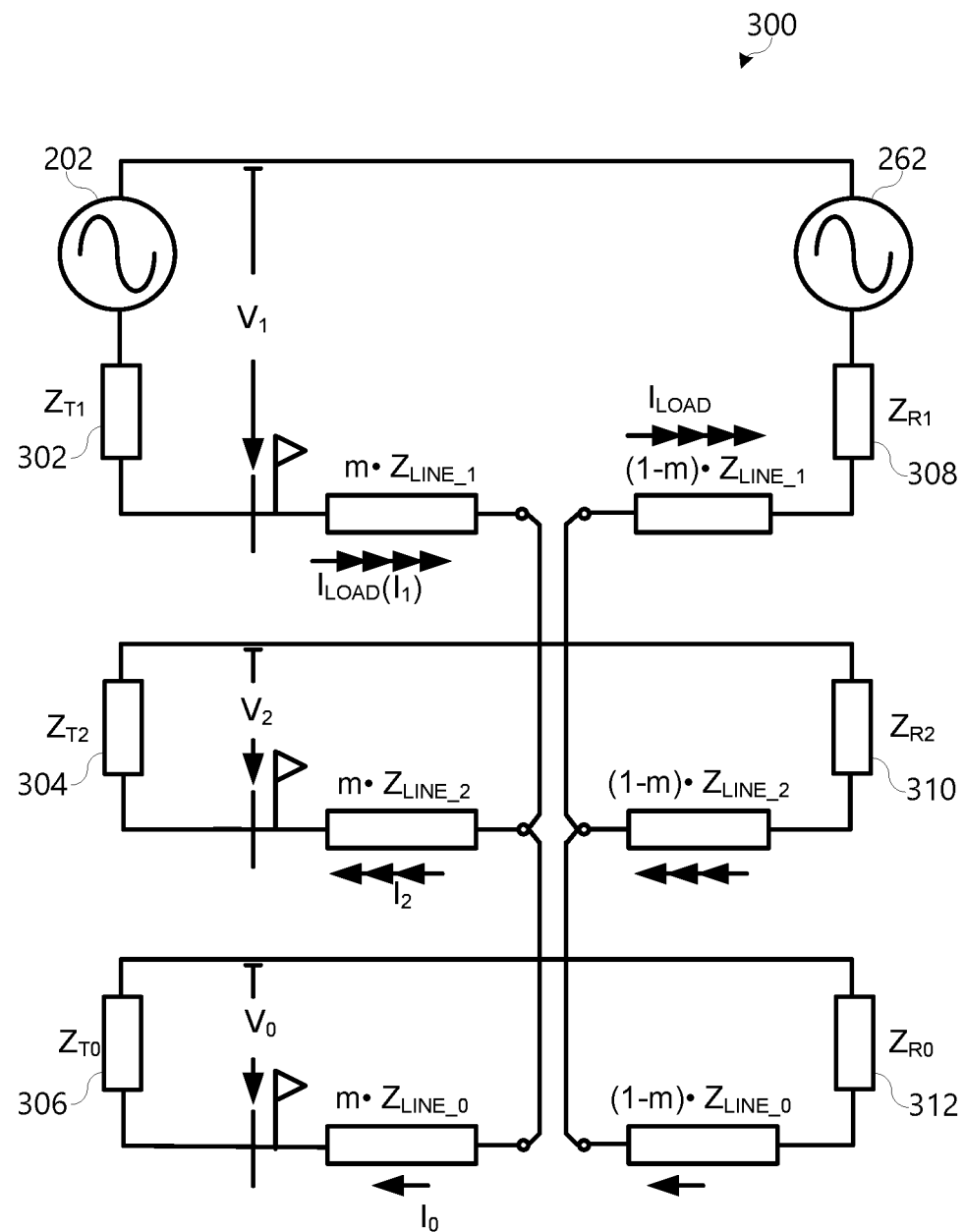
FIG. 3 illustrates a simplified sequence diagram during an open circuit condition with a broken phase conductor consistent with embodiments of the present disclosure.

FIG. 3 illustrates a simplified sequence diagram during an open circuit condition with a broken phase conductor consistent with embodiments of the present disclosure. Note that for simplicity, the shunt reactances are not illustrated. The illustrated sequence diagram does not illustrate shunt capacitance of the transmission line. In this sequence diagram and all further sequence diagrams in this disclosure will use the A-phase as reference. Also illustrated are the positive-sequence voltage $V_1$, negative-sequence voltage $V_2$, and zero-sequence voltage $V_0$. The sequence diagram includes an opening in the A-phase conductor at a location m from the transmitting end T, where m may be expressed in terms of per-unit distance. The load current direction is shown $I_{1BCD}$. Further shown are the sequence line impedances including the positive-sequence line impedance $Z_{LINE\_1}$, negative-sequence line impedance $Z_{LINE\_2}$, and zero-sequence line impedance $Z_{LINE\_0}$. Finally, the sequence currents are shown as positive-sequence current $I_1$, negative-sequence current $I_2$, and zero-sequence current $I_0$. The following observations may be made in Equations 2-5:

$$I_1 = -(I_2 + I_0) \qquad \text{Eq. 2}$$

Therefore:

$$\frac{|I_1|}{|I_0 + I_2|} = 1 \qquad \text{Eq. 3}$$

And:

$$|I_2| = |I_1| * \left(\frac{Z_{0_{Total}}}{Z_{0_{Total}} + Z_{1_{Total}}}\right) \qquad \text{Eq. 4}$$

Where:

$$Z_{1\_Total} = Z_{1\_Line} + Z_{T1} + Z_{R1} \qquad \text{Eq. 5A}$$

$$Z_{0\_Total} = Z_{0\_Line} + Z_{T0} + Z_{R0} \qquad \text{Eq. 5B}$$

$$|I_0| = |I_1| * \left(\frac{Z_{1\_Total}}{Z_{0\_Total} + Z_{1\_Total}}\right) \qquad \text{Eq. 5C}$$

To detect which of the phases is open, the angle difference between $I_1$, $I_2$, and $I_0$ can be employed. Using the A-phase current as a reference, the following observations may be made for a system with an "ABC" phase rotation in Equations 6-8:

A-Phase Open:

$$ANG(I_1) - ANG(I_2) \approx 180° \qquad \text{Eq. 6}$$
$$ANG(I_1) - ANG(I_0) \approx 180°$$

B-Phase Open:

$$ANG(I_1) - ANG(I_2) \approx 60° \qquad \text{Eq. 7}$$
$$ANG(I_1) - ANG(I_0) \approx -60°$$

C-Phase Open:

$$ANG(I_1) - ANG(I_2) \approx -60° \qquad \text{Eq. 8}$$
$$ANG(I_1) - ANG(I_0) \approx 60°$$

Figure 4A:
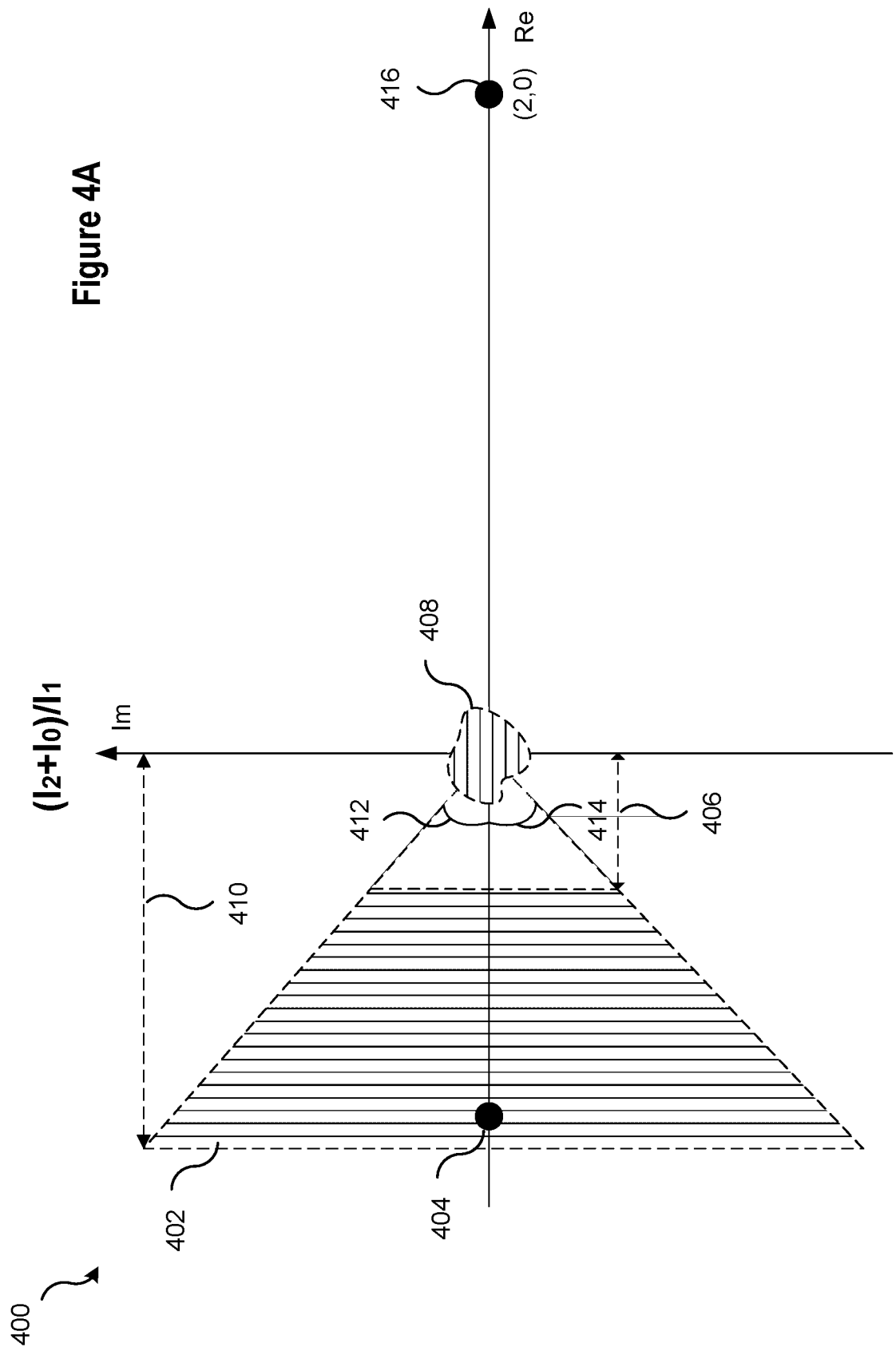
FIG. 4A illustrates a sequence current diagram showing a fault detection region consistent with embodiments of the present disclosure.

FIG. 4A illustrates a sequence current diagram 400 showing a fault detection region 402 consistent with embodiments of the present disclosure. The sequence current diagram 400 represents a relationship of sequence current quantities shown in Eq. 1. Point 404 reflects a sequence current operating point consistent with a single-phase-open fault. Point 416 shows a single-phase-ground fault. In other embodiments, additional fault detection regions (not shown) may be associated with other conditions.

A fault detection region 402, which is identified by vertical stripes, surrounds point 404. The fault detection region 402 is defined between a minimum ratio threshold 406 and a maximum ratio threshold 410. In the illustrated embodiment, the minimum ratio threshold 406 and the maximum ratio threshold 410 each comprise a fixed value. Stated in other terms, the maximum ratio threshold 410 and the minimum ratio threshold 406 create vertical lines. The fault detection region 402 is further defined by a maximum angle threshold 412 and a minimum angle threshold 414. Upon the occurrence of a fault, the sequence current quantities may leave operating region 408. If the sequence current quantities enter into the fault detection region 402 a protective action may be implemented to remedy the fault condition.

An area encompassed by fault detection region 402 and operating region 408 may be adjusted based on conditions in an electric power system. Specifically, the maximum ratio threshold 410, minimum ratio threshold 406, maximum angle threshold 412, and minimum angle threshold 414 may be parameters customized to a particular system. The minimum ratio threshold 406 may be established at a level such to provide a margin around operating region 408. The operating region 408 may encompass the sequence current quantities associated with typical operating conditions. In one specific embodiment, the default setting of maximum ratio threshold 410 is 1.2, the maximum angle threshold 412 is 45 degrees, the minimum angle threshold 414 is −45 degrees, and the minimum ratio threshold 406 is 0.5. These default settings may be suitable for many applications. The fault detection region 402, which is based on these typical values, is a right isosceles trapezoid; however, in other embodiments, a fault detection region may have other shapes.

Various criteria may be considered for establishing values for minimum ratio threshold 406, maximum ratio threshold 410, maximum angle threshold 412, and minimum angle threshold 414. Line capacitive current influences the maximum ratio threshold 410. System unbalance and loading influences the minimum ratio threshold 406. System loading and line parameters influence maximum angle threshold 412 and minimum angle threshold 414. Each of these parameters may be considered in establishing the thresholds.

FIG. 4B illustrates a sequence current diagram 450 showing a fault detection region 452 consistent with embodiments of the present disclosure. A shape of a fault detection region 452 is defined by a maximum radius 456 and a minimum radius 454 from the origin. Minimum radius 454 defines a separation between operating region 408 and fault detection region 452. Maximum radius 456 defines a maximum ratio that may be selected based on Point 404 may lie between minimum ratio threshold 406 and maximum ratio threshold 410 of FIG. 4A. FIG. 4B defines fault detection region 452 based on a magnitude range of the ratio of Eq. 1.

FIG. 4C illustrates a sequence current diagram with a reduced operating region for a two-terminal line that experiences a complete loss of load for a broken phase consistent with embodiments of the present disclosure. In the illustrated embodiment, fault detection region 452 may be constrained more tightly in comparison to the fault detection regions shown in FIG. 4A and FIG. 4B.

Figure 5A:
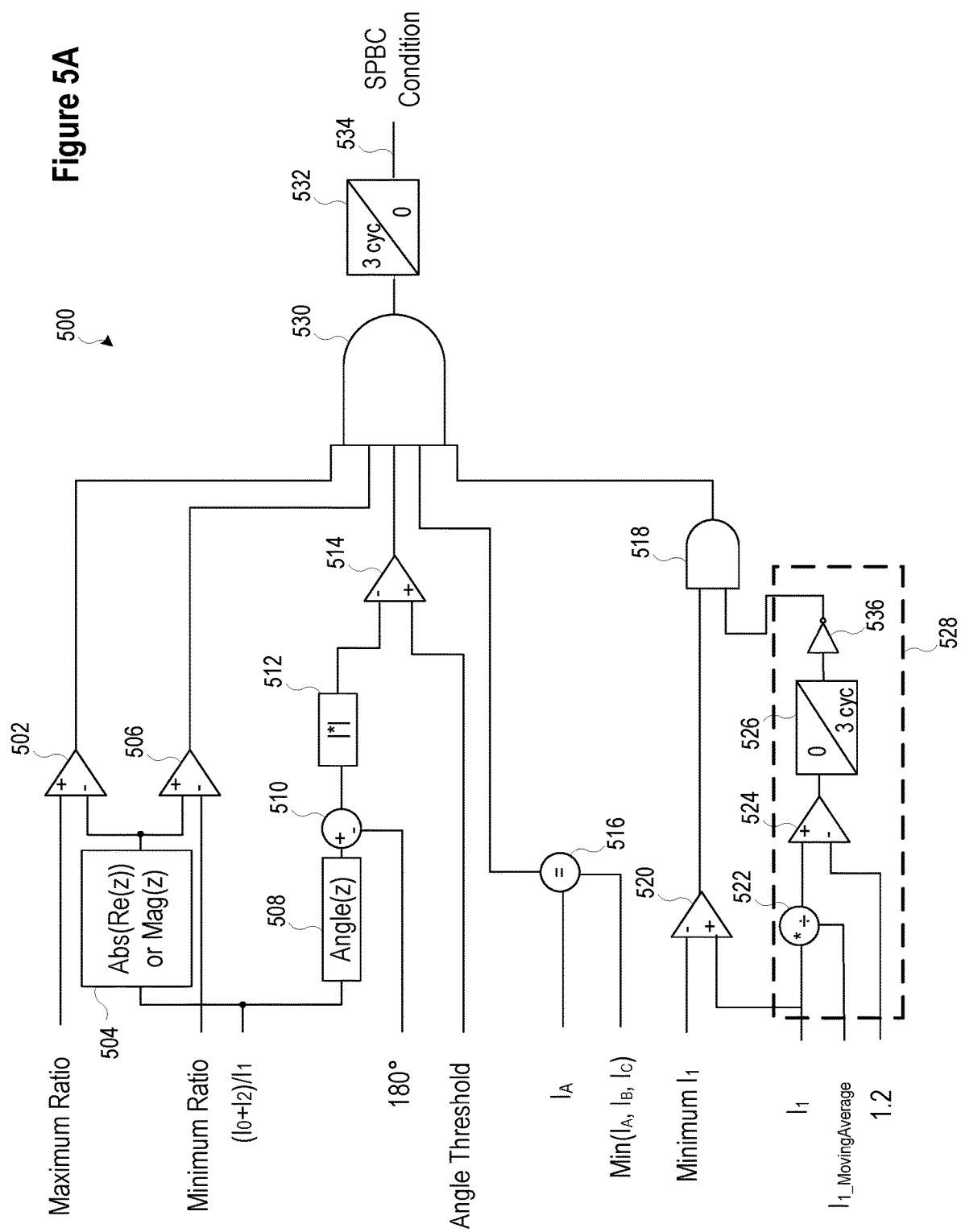
FIG. 5A illustrates a logic diagram of a fault protection system consistent with embodiments of the present disclosure.

FIG. 5A illustrates a logic diagram of a fault protection system 500 consistent with embodiments of the present disclosure. Although a single phase is illustrated, other phases may be monitored using similar systems and are not illustrated in FIG. 5A. In various embodiments, fault protection system 500 may operate using positive-sequence current information and may rely exclusively on local measurements. Fault protection system 500 may receive a variety of measurements of electrical parameters (e.g., a current measurement ($I_A$)), settings and thresholds (e.g., a maximum current ratio, a minimum current ratio, an angle threshold, a minimum current value), and calculated quantities (e.g., a sequence current component ($I_1$), the value of Eq. 1).

Various settings may be established in connection with fault protection system 500. In the illustrated embodiment, the settings include a minimum ratio, a maximum ratio, and an angle threshold. Default settings may be utilized in some applications. For example, a default setting of 1.2 may be used for the maximum ratio, a default setting of 0.5 may be used for the minimum ratio, and 45 degrees may be used as a default setting for the angle tolerance in typical applications.

System 500 may differentiate between a single-phase-broken-conductor (SPBC) condition and other shunt fault types based on the following conditions: (1) the positive sequence current ($I_1$) will not increase during an SPBC condition, but $I_1$ magnitude will increase during other shunt fault conditions; and (2) the broken-conductor phase will have the smallest phase current among all three phases for transmission applications and will be purely capacitive.

A real component of an input corresponding to the value of Eq. 1 may be determined by block 504, and an angle component of the input may be determined by block 508. A comparator 502 may compare the real component of Eq. 1 to a maximum ratio setting, and may assert when the maximum ratio exceeds the real component. Similarly, comparator 506 may compare the real portion of Eq. 1 to a minimum threshold and may assert when the real component exceeds the minimum ratio. In other words, comparator 502 and comparator 506 may determine whether the real component of Eq. 1 determined by block 504 is between the maximum ratio and the minimum ratio.

The angle component of Eq. 1 may be combined with a fixed value of 180° by block 510, and block 512 may determine the absolute value of the angle. The output of block 512 may be compared to an angle threshold by a comparator 514. Comparator 514 may assert when the angle component of Eq. 1 is within the angle threshold.

Block 516 may ensure that a phase current $I_A$ is equal to a minimum phase current. As discussed above, a broken-conductor phase will have the smallest phase current among all three phases for transmission applications and will be purely capacitive. Some modifications may be made for distribution applications to increase reliability. For example, the minimum ratio setting value may be modified to accommodate tapped feeders in the distribution system.

A sequence current component, $I_1$, may be assessed using various criteria to differentiate a SPBC condition from a shunt fault and to avoid any unintended operation. A comparator 520 may compare the value of $I_1$ to a minimum current, and an output of comparator 520 may assert when the value of $I_1$ exceeds the minimum value. The output of comparator 520 may also be an input to AND gate 518. Element 522 may combine the value of $I_1$ to its moving average. An output of element 522 may be compared to a threshold, which in the specifically illustrated embodiment is 1.2, by a comparator 524. A counter 526 may monitor the output of comparator 524, and an output of counter 526 may assert if the condition persists for 3 cycles. In other embodiments, counter 526 may be set to ensure that the condition persists for a different duration. The assertion of counter 526 is indicative of a shunt fault condition, rather than a single phase broken conductor. An inverter 536 may invert the signal of counter 526, and an output of inverter 536 may be an input to AND gate 518. The elements within box 528 may collectively differentiate a shunt fault from an single-phase broken conductor fault.

Figure 5B:
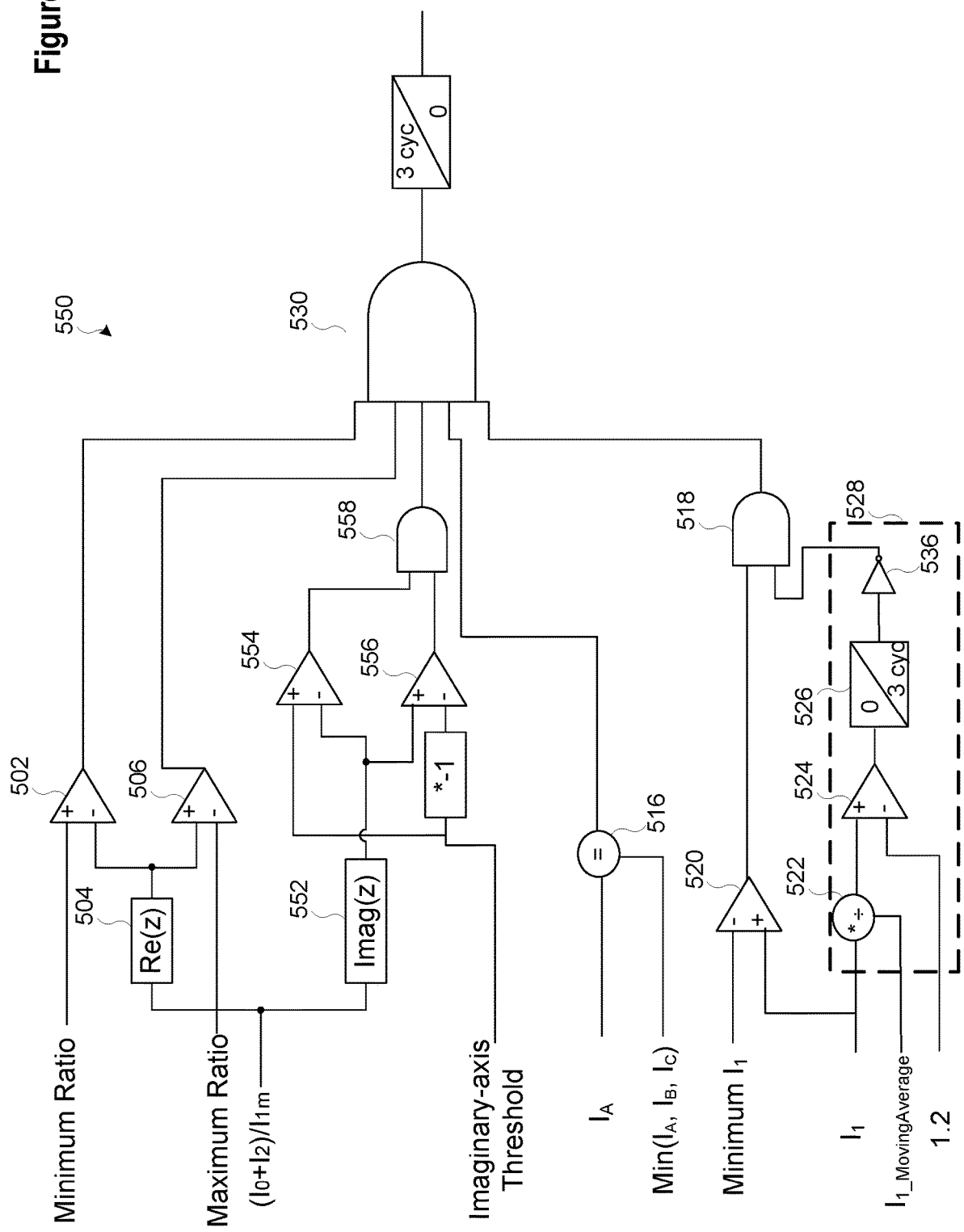
FIG. 5B illustrates an alternative embodiment of the fault protection system of FIG. 5A consistent with embodiments of the present disclosure.

The results of the various comparisons and operations described above may be provided as inputs to AND gate 530. When all inputs of AND gate 530 are asserted, a counter 532 may begin counting. In the illustrated embodiment, counter 532 counts three cycles before asserting, but shorter or longer periods may be established. In other embodiments, the value of counter 532 may be adjusted to ensure that a condition persists for a sufficient time to avoid operation based on a transient condition and avoid an unnecessary protective action. FIG. 5B illustrates a logic diagram of a fault protection system 550, which is an alternative embodiment of the fault protection system of FIG. 5A, consistent with embodiments of the present disclosure. Fault protection system 550 may account for charging current, which is comparable to load current under light load conditions. Fault protection system 550, like other embodiments described herein, uses values of $I_1$, $I_2$, and $I_0$ that are measured at a relay location. These sequence quantities, in most transmission and sub-transmission cases, with significant loss of load equal the sequence quantities at the fault point. When the loading conditions are low and the line charging current is significant, additional factors may be considered. In some specific applications, fault protection system 550 may be utilized for implementing a reduced operating region, such as the reduced operating region illustrated in FIG. 4C.

When a phase conductor breaks but before it falls to the ground, the current measured by the relay for that phase is the charging current. The current flowing through line-capacitors should be subtracted from the value of $I_1$ computed at the relay location. In some embodiments, the value to be subtracted ($I_{1_{sub}}$) is the magnitude of charging current. For example, for a break in the A-phase, the magnitude of $|I_{1_{sub}}|$ may be assumed to be $|I_A|$.

A value $I_{1m}$ may be determined using Eq. 9. The angle of $I_{1_{sub}}$ is the charging current. As such, the angle of $I_{1_{sub}}$ should lead the voltage by 90°. Eqs. 10-12 describe the relationships between other monitored parameters.

$$I_{1m} = I_{1A} - I_{1_{sub}} \quad \text{Eq. 9}$$

$$I_{1_{sub}} = |I_A| < (\text{angle}(V_{1A}) + 90°) \quad \text{Eq. 10}$$

$$I_{1m} = I_{1A} - |I_A| < (\text{angle}(V_{1A}) + 90°) \quad \text{Eq. 11}$$

$$\frac{I_0 + I_2}{I_{1m}} \approx -1 \quad \text{Eq. 12}$$

Figure 6:
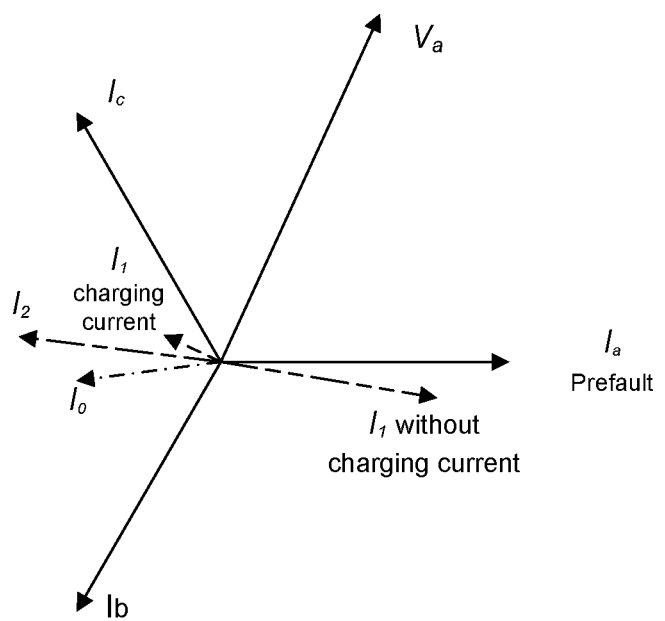
FIG. 6 illustrates a diagram showing the impact of line charging current on sequence current consistent with the present disclosure.

FIG. 6 illustrates a diagram showing the impact of line charging current on sequence current consistent with the present disclosure. For two-terminal transmission lines, after a single-phase-conductor breaks but before the broken conductor touches the ground to become a shunt fault, the measured current of the broken-phase will be the line charging current. Depending on various factors (e.g., the location of the broken conductor and the length of line), there is potentially a significant amount of charging current measured at the line terminals. Systems and methods consistent with the present disclosure may monitor and assess the charge current in various embodiments.

Due to the capacitive nature of charging current, the charging current is often out of the phase with a load current as illustrated in FIG. 6. Therefore, the calculated total positive-sequence current is less than the theoretical result of SPBC condition, which assumes that the current of the broken phase is zero. As a result, the value of Eq. 1 will be slightly above 1 under real-world conditions. Normally, the line charging current is significantly less than the load current. Therefore, a maximum current ratio greater than 1 (e.g., 1.2) is sufficient in many instances.

After a single-phase conductor is broken but before the broken conductor touches the ground and becomes a shunt fault, the measured current of the broken phase will be the line charging current if it is significant enough. In some cases, there is an arcing process before the load current stops flowing. For multi-terminal transmission lines, if every terminal is equipped with this protection function, at least one terminal will likely detect the condition without reducing a default minimum threshold setting. In two-terminal applications, appropriate adjustment may be implemented.

Figures 7A, 7B, 7C:
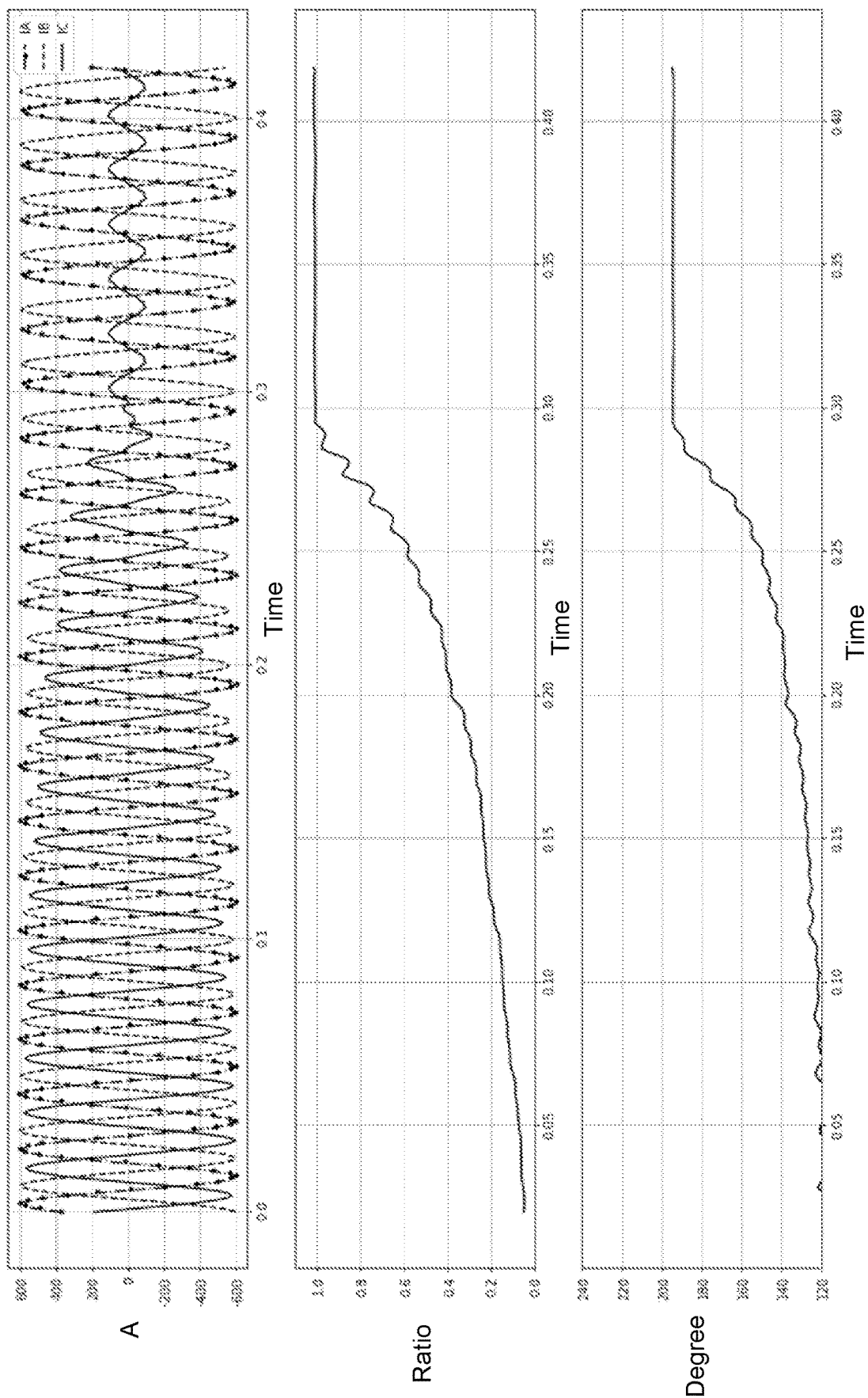
FIG. 7A shows a plot over time of current values in a three-phase system during an open-circuit fault associated with a C-phase and consistent with embodiments of the present disclosure.
FIG. 7B illustrates a plot of the sequence current quantities shown in Eq. 1 over the same period as FIG. 7A and consistent with embodiments of the present disclosure.
FIG. 7C illustrates a plot of an angle over the same period as FIG. 7A and consistent with embodiments of the present disclosure.

FIG. 7A shows a plot over time of current values in a three-phase system during an open-circuit fault associated with the C-phase and consistent with embodiments of the present disclosure. The fault results in the C-phase current decreasing from the load current to the charging current due to the arcing in the process of the conductor breaking and then becoming open circuited.

FIG. 7B illustrates a plot of the sequence current quantities shown in Eq. 1 over the same period as FIG. 7A and consistent with embodiments of the present disclosure. The quantity increases from approximately zero to a steady value close to a value of 1 after approximately 0.3 seconds.

FIG. 7C illustrates a plot of an angle over the same period as FIG. 7A and consistent with embodiments of the present disclosure. The angle increases as a result of the fault in the C-Phase and reaches a steady value of approximately 180 degrees.

Figure 7D:
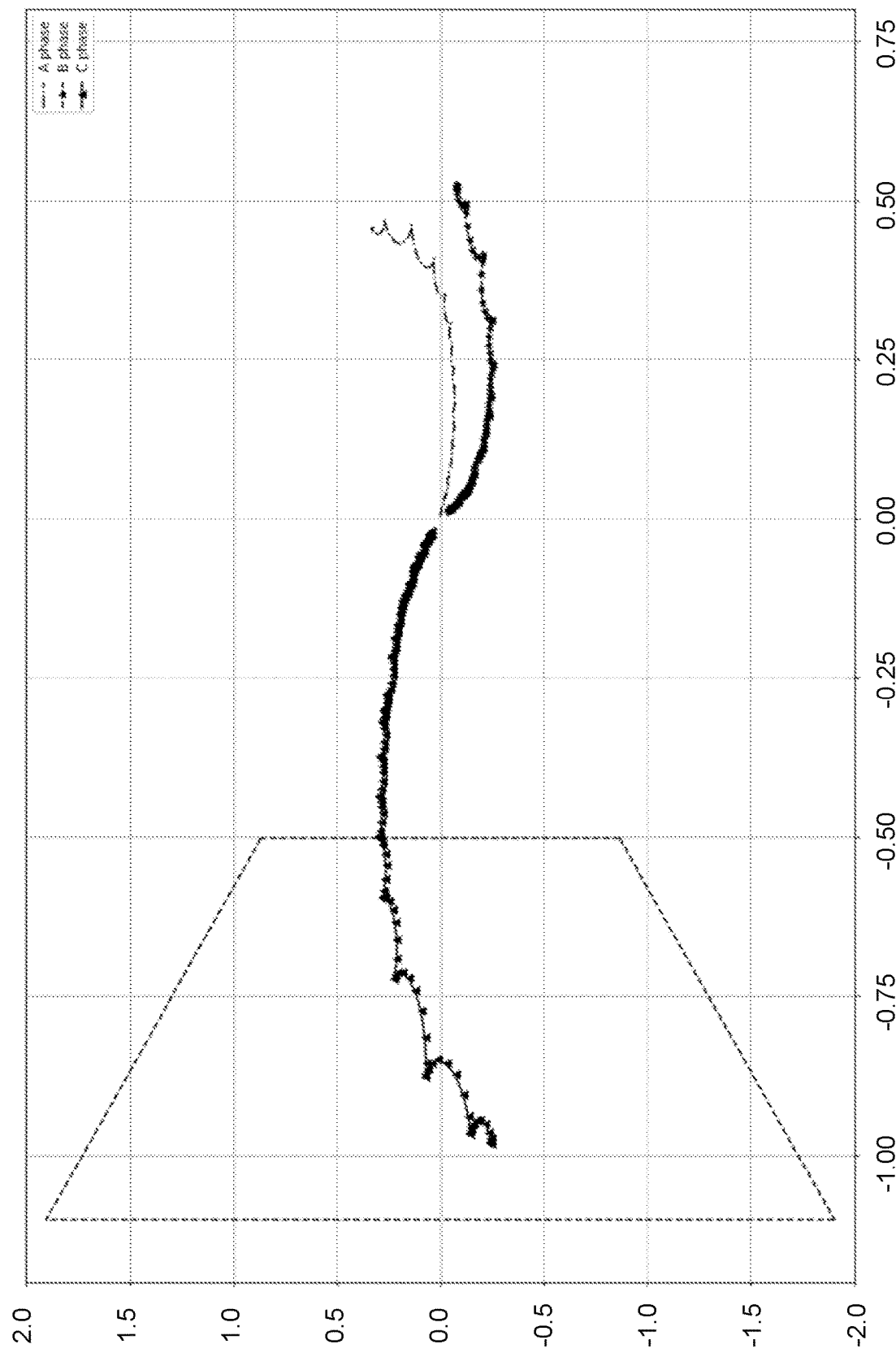
FIG. 7D illustrates the single-phase-broken-conductor detection result of each phase in a complex number domain consistent with embodiments of the present disclosure.

FIG. 7D illustrates the single-phase-broken-conductor detection result of each phase in the complex number domain consistent with embodiments of the present disclosure. The A-phase and B-phase based results show the ratio increased from 0 to 0.5 but the angles are in the opposite direction for the C-phase fault. Therefore, these two phases are clearly declared as non-faulted phases.

Figure 8:
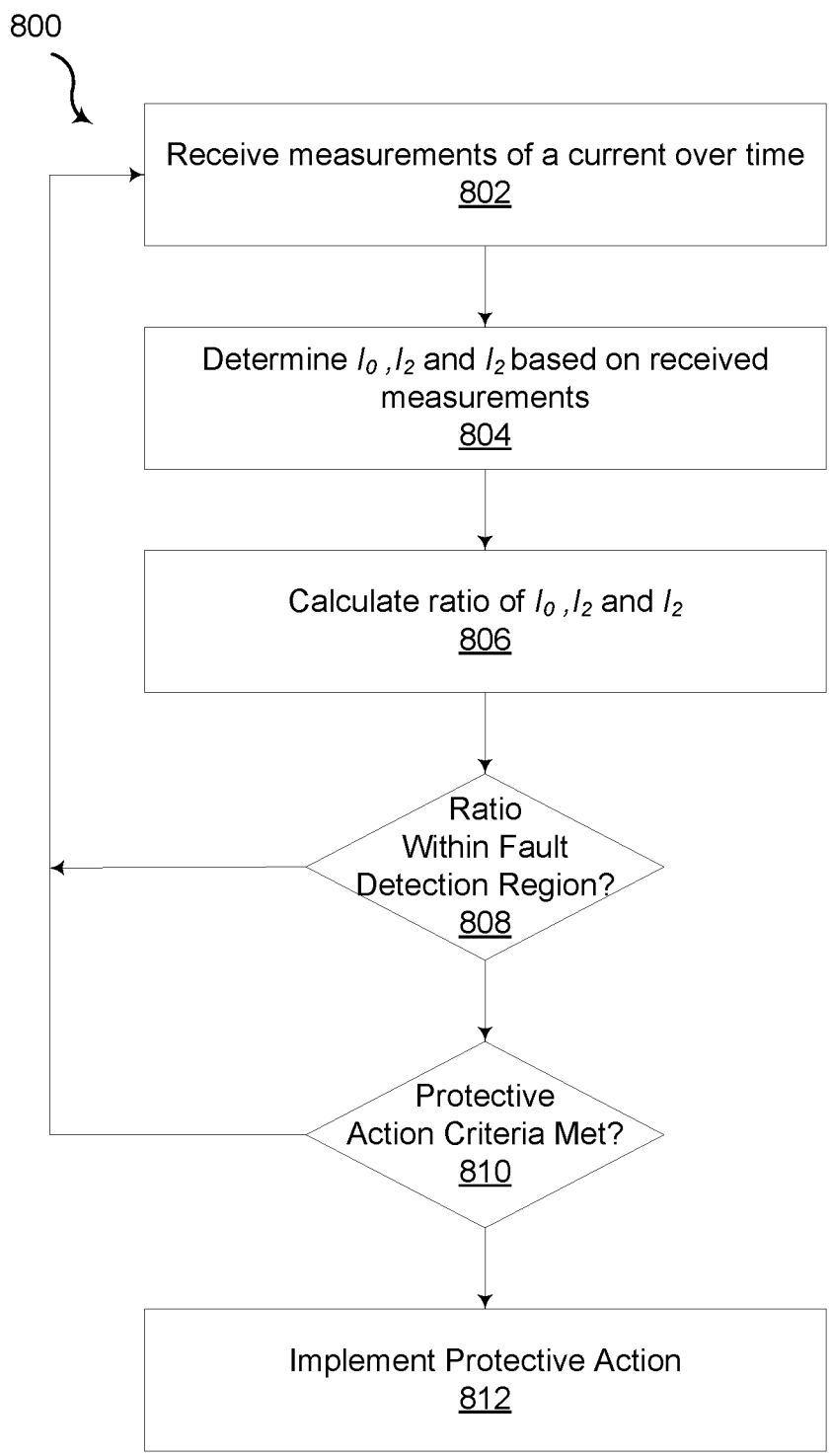
FIG. 8 illustrates a flow chart of a method for detecting a fault in an electric power system consistent with embodiments of the present disclosure.

FIG. 8 illustrates a flow chart of a method 800 for detecting a fault in an electric power system consistent with embodiments of the present disclosure. At 802, a system implementing method 800 may receive measurements of a current over time. Such measurements may be generated by a current transformer in electrical communication with a conductor that carries one electrical phase in a multi-phase electrical system. In other embodiments, a merging unit may provide a stream of digitized measurements to an IED.

The current measurements may be used to determine a zero-sequence current, a negative-sequence current, and a positive-sequence current at 804. At 806, a ratio of the zero-sequence current, negative-sequence current, and positive-sequence current values may be determined. In various embodiments, the ratio comprises a sum of the zero-sequence current and the negative-sequence current, divided by the positive-sequence current, as shown in Eq. 1.

A system implementing method 800 may determine at 808 whether the ratio is within a fault detection region. The fault detection region may be defined between a maximum threshold and a minimum threshold of a real component of the ratio, and between a maximum angle threshold and a minimum threshold. Specific examples of fault detection regions are illustrated in FIG. 4A and FIG. 4B and are described above.

A system implementing method 800 may determine at 810 whether various protective action criteria are met. Such criteria may include, for example, determining that a faulted phase is the phase with the minimum current, determining that the positive-sequence current exceeds a minimum threshold, and assessing the positive-sequence current value and its moving average with respect to a threshold. Specific examples of protective action criteria are illustrated in FIG. 5 and described above.

At 812, a protective action may be implemented based on detection of a single phase broken conductor. The protective action may include deenergizing the broken conductor. In some embodiments, the protective action may be implemented within a window defined by the time for the suspended conductor to fall to the ground. Such embodiments may eliminate or reduce the possibility of damage caused by arcing when an energized conductor contacts the ground.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A system to detect a fault in an electric power system, the system comprising:
an intelligent electronic device (IED) to receive a plurality of measurements over time of a current through an electrical conductor in the electric power system;
a fault detection subsystem to monitor for a broken conductor condition and configured to:
determine a zero-sequence current based on the measurements of the current;
determine a negative-sequence current based on the measurements of the current;
determine a positive-sequence current based on the measurements of the current;
determine a ratio of the zero-sequence current, the negative-sequence current, and the positive-sequence current;
monitor the ratio over a time; and
identify the broken conductor condition based on the ratio; and
a protective action subsystem to implement a protective action based on identification of the broken conductor condition.

2. The system of claim 1, wherein the fault detection subsystem is further configured to:
determine a real component and an imaginary component of the ratio; and
identify the broken conductor condition when:
the real component of the ratio falls between a minimum ratio threshold and a maximum ratio threshold; and
the imaginary component of the ratio falls between a maximum angle threshold and a minimum angle threshold.

3. The system of claim 2, wherein the minimum ratio threshold and the maximum ratio threshold are defined between one of a fixed minimum real value and a fixed maximum real value, and a minimum radius and a maximum radius.

4. The system of claim 1, wherein the ratio comprises a sum of the zero-sequence current and the negative-sequence current, divided by the positive-sequence current.

5. The system of claim 1, wherein the plurality of measurements comprise only measurements from a local node.

6. The system of claim 1, wherein the electrical conductor comprises a suspended conductor and the protective action subsystem is configured to implement the protective action within a window defined by a time for the suspended conductor to fall to the ground.

7. The system of claim 1, wherein the electric power system comprises multiple phases, and the fault detection subsystem is further configured to monitor each phase.

8. The system of claim 7, wherein the fault detection subsystem is further configured to:
identify a phase with a minimum current; and
confirm that the phase with the minimum current corresponds to a phase associated with the broken conductor condition prior to implementation of the protective action.

9. The system of claim 1, wherein the fault detection subsystem is further configured to compare the positive-sequence current to a minimum current requirement, and to implement the protective action only when the positive-sequence current exceeds the minimum current requirement.

10. The system of claim 1, wherein the fault detection subsystem is further configured to identify at least one of a single-phase-ground fault, a phase-phase fault, a phase-phase-ground fault, and a 3-phase fault based on the ratio, and the protective action subsystem is further configured to implement the protective action based on identification of such a fault.

11. The system of claim 1, wherein the fault detection subsystem is further configured to:
identify a minimum phase current;
determine a magnitude of a phasor corresponding to the minimum phase current
determine an angle of the phasor corresponding to an angle of positive sequence voltage advanced by 90 degrees;
determine a refined ratio by subtracting the phasor from the ratio.

12. The system of claim 11, wherein the refined ratio compensates for the charging current of the electrical conductor.

13. A method of detecting a fault in an electric power system, the method comprising:
receiving, using an intelligent electronic device (IED) a plurality of measurements over time of a current through an electrical conductor in the electric power system to monitor for a broken conductor condition;
determining, using a fault detection subsystem, a zero-sequence current based on a measurement of the current;
determining, using the fault detection subsystem, a negative-sequence current based on the measurement of the current;
determining, using the fault detection subsystem, a positive-sequence current based on the measurement of the current;
determining, using the fault detection subsystem, a ratio of the zero-sequence current, the negative-sequence current, and the positive-sequence current;

monitoring, using the fault detection subsystem, the ratio over a time;
identifying, using the fault detection subsystem, the broken conductor condition based on the ratio; and
implementing, using a protective action subsystem, a protective action based on identification of the broken conductor condition.

14. The method of claim 13, further comprising:
determining, using the fault detection subsystem, a real component and an imaginary component of the ratio;
identifying, using the fault detection subsystem, the broken conductor condition when:
the real component of the ratio falls between a minimum ratio threshold and a maximum ratio threshold; and
the imaginary component of the ratio falls between a maximum angle threshold and a minimum angle threshold.

15. The method of claim 14, wherein the minimum ratio threshold and the maximum ratio threshold are defined between one of a fixed minimum real value and a fixed maximum real value, and a minimum radius from an origin and a maximum radius from an origin.

16. The method of claim 13, wherein the ratio comprises a sum of the zero-sequence current and the negative-sequence current, divided by the positive-sequence current.

17. The method of claim 13, wherein the plurality of measurements comprise only measurements from a local node.

18. The method of claim 13, wherein the electrical conductor comprises a suspended conductor and the protective action subsystem is configured to implement the protective action within a window defined by the time for the suspended conductor to fall to the ground.

19. The method of claim 13, further comprising:
monitoring, using the fault detection subsystem, a plurality of phases.

20. The method of claim 19, further comprising:
identifying, using the fault detection subsystem, a phase with a minimum current; and
confirming, using the fault detection subsystem, that the phase with the minimum current corresponds to a phase associated with the broken conductor condition prior to implementing the protective action.

21. The method of claim 13, further comprising:
comparing, using the fault detection subsystem, the positive-sequence current to a minimum current requirement; and
implementing the protective action only when the positive-sequence current exceeds the minimum current requirement.

22. The method of claim 13, further comprising:
identifying, using the fault detection subsystem, at least one of a single-phase-ground fault, a phase-phase fault, a phase-phase-ground fault, and a 3-phase fault based on the ratio, and
implementing, using the protective action subsystem, the protective action based on identification of such a fault.

23. The method of claim 13, further comprising:
identifying, using the fault detection subsystem, a minimum phase current;
determining, using the fault detection subsystem, a magnitude of a phasor corresponding to the minimum phase current
determining, using the fault detection subsystem, an angle of the phasor corresponding to an angle of positive sequence voltage advanced by 90 degrees;
determining, using the fault detection subsystem, a refined ratio by subtracting the phasor from the ratio.

24. The method of claim 23, wherein the refined ratio compensates for the charging current of the electrical conductor.

* * * * *